US010590863B2

(12) United States Patent
Vierkotten et al.

(10) Patent No.: US 10,590,863 B2
(45) Date of Patent: Mar. 17, 2020

(54) REGULATING DEVICE FOR AN INTERNAL COMBUSTION ENGINE

(71) Applicants: PIERBURG GMBH, Neuss (DE); FORD-WERKE GMBH, Cologne (DE)

(72) Inventors: Dirk Vierkotten, Much (DE); Maximilian Flender, Duesseldorf (DE); Christian Vigild, Aldenhoven (DE); Andreas Kuske, CM Geulle (NL); Franz Arnd Sommerhoff, Aachen (DE); Helmut Kindl, Aachen (DE); Joerg Kemmerling, Monschau (DE); Vanco Smiljanovski, Bedburg (DE); Hanno Friederichs, Aachen (DE)

(73) Assignees: PIERBURG GMBH, Neuss (DE); FORD-WERKE GMBH, Cologne (DE)

( * ) Notice: Subject to any disclaimer, the term of this patent is extended or adjusted under 35 U.S.C. 154(b) by 0 days.

(21) Appl. No.: 16/060,422

(22) PCT Filed: Nov. 14, 2016

(86) PCT No.: PCT/EP2016/077574
§ 371 (c)(1),
(2) Date: Jun. 8, 2018

(87) PCT Pub. No.: WO2017/097541
PCT Pub. Date: Jun. 15, 2017

(65) Prior Publication Data
US 2019/0003402 A1 Jan. 3, 2019

(30) Foreign Application Priority Data
Dec. 11, 2015 (DE) .................. 10 2015 121 617

(51) Int. Cl.
*F02D 9/10* (2006.01)
*F02M 26/21* (2016.01)
(Continued)

(52) U.S. Cl.
CPC ............. *F02D 9/101* (2013.01); *F02M 26/06* (2016.02); *F02M 26/21* (2016.02); *F02M 26/50* (2016.02);
(Continued)

(58) Field of Classification Search
CPC .. B29L 2031/7506; F02D 9/107; F16K 1/222; F02M 26/21; F02M 26/50;
(Continued)

(56) References Cited

U.S. PATENT DOCUMENTS 6,047,950 A    4/2000  Pontoppidan et al.
6,354,267 B1 * 3/2002  Kotchi ................ F02D 9/10
                                         123/337
(Continued)

FOREIGN PATENT DOCUMENTS

CN    1202951 A    12/1998
CN    103382833 A  11/2013
(Continued)

*Primary Examiner* — Hai H Huynh
*Assistant Examiner* — Gonzalo Laguarda
(74) *Attorney, Agent, or Firm* — Norman B. Thot

(57) ABSTRACT

A regulating device for an internal combustion engine includes an exhaust gas recirculation pipe which opens into an intake pipe which are both formed in a housing, and a regulating element eccentrically mounted on a shaft. The shaft is arranged perpendicular to a center line of the intake pipe and the exhaust gas recirculation pipe. The regulating element includes a first surface, a second surface, and guide ribs arranged on the first surface. In a first end position of the regulating element, in which the intake pipe is at least throttled upstream of an opening of the exhaust gas recir-
(Continued)

culation pipe, a normal vector of the first surface points to an upstream side of the intake pipe. In a second end position of the regulating element, in which the exhaust gas recirculation pipe is closed, a normal vector of the second surface points to the exhaust gas recirculation pipe.

12 Claims, 4 Drawing Sheets

(51) Int. Cl.
  *F02M 26/64* (2016.01)
  *F02M 26/70* (2016.01)
  *F02M 26/06* (2016.01)
  *F02M 26/71* (2016.01)
  *F02M 26/50* (2016.01)
  F02D 9/02 (2006.01)
  B29L 31/00 (2006.01)

(52) U.S. Cl.
  CPC ............ *F02M 26/64* (2016.02); *F02M 26/70* (2016.02); *F02M 26/71* (2016.02); *B29L 2031/7506* (2013.01); *F02D 9/107* (2013.01); *F02D 2009/0276* (2013.01)

(58) Field of Classification Search
  CPC ........ F02M 26/64; F02M 26/70; F02M 26/17; F02M 26/19; F02M 26/38
  USPC ........................................ 123/568.17, 568.18
  See application file for complete search history.

(56) References Cited

U.S. PATENT DOCUMENTS

| | | | |
|---|---|---|---|
| 6,354,567 B1* | 3/2002 | Vanderveen | F02D 9/101 251/308 |
| 2003/0042448 A1* | 3/2003 | Conley | F02D 9/1015 251/118 |
| 2004/0187920 A1* | 9/2004 | Schmidt | F02D 9/1065 137/15.25 |
| 2007/0102661 A1 | 5/2007 | Isogai et al. | |
| 2010/0206264 A1 | 8/2010 | Emmert et al. | |
| 2014/0117267 A1 | 5/2014 | Gerards et al. | |
| 2015/0027420 A1* | 1/2015 | Antoni | F02M 35/10222 123/568.21 |
| 2015/0198119 A1 | 7/2015 | Kuske et al. | |
| 2017/0067419 A1* | 3/2017 | Tofukuji | F02M 26/18 |
| 2017/0145967 A1* | 5/2017 | Penzato | F02M 26/17 |
| 2019/0078538 A1* | 3/2019 | Hayashi | F02M 26/21 |

FOREIGN PATENT DOCUMENTS

| | | |
|---|---|---|
| CN | 103620190 A | 3/2014 |
| CN | 104145110 A | 11/2014 |
| CN | 104791144 A | 7/2015 |
| DE | 102 40 762 A1 | 4/2003 |
| DE | 10 2006 051 987 B4 | 8/2013 |
| DE | 10 2012 101 851 B4 | 6/2014 |
| DE | 10 2013 223 053 A1 | 5/2015 |
| DE | 10 2014 200 699 A1 | 7/2015 |
| EP | 1 408 263 A1 | 4/2004 |
| JP | 2001-98959 A | 4/2001 |
| WO | WO 2009/071403 A1 | 6/2009 |

* cited by examiner

REGULATING DEVICE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2016/077574, filed on Nov. 14, 2016 and which claims benefit to German Patent Application No. 10 2015 121 617.5, filed on Dec. 11, 2015. The International Application was published in German on Jun. 15, 2017 as WO 2017/097541 A1 under PCT Article 21(2).

FIELD

The present invention relates to a regulating device for an internal combustion engine having an intake pipe, an exhaust gas recirculation pipe that opens into the intake pipe, a housing in which the intake pipe and the exhaust gas recirculation pipe are formed, a shaft acting as an axis of rotation on which a regulating element is eccentrically mounted and which is arranged perpendicularly to the center lines of the intake pipe and the exhaust gas recirculation pipe, wherein in a first end position, in which the intake pipe is at least throttled upstream of an opening of the exhaust gas recirculation pipe, a normal vector of a first surface of the regulating element points to the upstream side of the intake pipe, and in a second position, in which the exhaust gas recirculation pipe is closed, a normal vector of a second surface of the regulating element points to the exhaust gas recirculation pipe.

Such regulating devices are used in internal combustion engines to regulate the gas flow to be introduced into a cylinder of an internal combustion engine with regard to its composition of recirculated exhaust gas quantities or air quantities freshly taken in. Different mixing ratios are set for reaching minimum exhaust gas values and maximum performance values depending on the operating condition of the internal combustion engine.

For regulating purposes, either two separate valves can be used, wherein a total quantity regulation via the two valves is possible, or these regulating valves comprise two valve elements which are actuated via a common actuating device so that only the mixture is changed. This configuration is in particular used in the case of turbocharged engines where the total quantity taken in can be regulated via the performance of the compressor. It is also known to use only one regulating element which cooperates with the two pipes instead of two regulating elements in order to be able to realize an even smaller configuration of the regulating device. In the case of these configurations the exhaust gas recirculation pipe usually opens into the air intake pipe immediately downstream of the damper acting as a throttle valve. At the desired increase of the exhaust gas recirculation rate, the throttle damper is closed to the same extent to which the exhaust gas recirculation valve is opened, which results in an increase of the pressure gradient in the exhaust gas recirculation pipe besides the increase of the free cross-section of the exhaust gas recirculation pipe, whereby the fraction of the exhaust gas as compared with the air quantity taken in is additionally increased.

Such an arrangement is described, for example, in DE 10 2012 101 851 B4 where two dampers arranged in parallel are actuated via a common rotating shaft so that, when the two dampers are rotated, the first damper is removed from the valve seat of the air intake pipe, while the second damper approaches the valve seat of the exhaust gas recirculation pipe, which is arranged perpendicularly to the valve seat of the air intake pipe, until the air intake pipe is fully opened and the exhaust gas recirculation pipe is fully closed. The valve seats for both the second damper governing the exhaust gas recirculation pipe and for the first damper governing the air intake pipe are configured as stoppers against which the dampers fully rest in their position for closing the respective pipe. The rotating shaft is arranged at a housing wall between the opening of the exhaust gas recirculation pipe and the valve seat in the air intake pipe so that the flow is not affected by the shaft or by the damper element when the exhaust gas recirculation pipe is closed.

DE 10 2006 051 987 B4 describes a centrically mounted throttle damper on whose surface a plurality of ribs extending perpendicularly to the damper shaft are formed which serve for straightening the gas flow.

WO 2009/071403 A1 describes a throttle damper on whose surface ribs are formed which extend from the centrally mounted shaft to the outside, wherein the height of the ribs decreases with increasing distance to the shaft. These ribs serve to reinforce the damper element.

Pressure losses and a resultant loss of performance of the compressor of a turbocharger as well as of the downstream internal combustion engine occurs in the arrangement of these throttle dampers and combined exhaust gas recirculation and throttle dampers in front of a compressor of a turbocharger in an intake system since the combination of the gas flows causes a narrowing of the available through-flow cross-section due to a throttling via the dampers. This throttling and the blending of the two gas flows also lead to turbulences which also produce a flow resistance.

SUMMARY

An aspect of the present invention is to provide a regulating device for an internal combustion engine via which, with the air flow and the exhaust gas flow being adequately regulated compared to known configurations, pressure losses can be avoided and thus an increased performance of a downstream compressor and/or a downstream internal combustion engine can be attained.

In an embodiment, the present invention provides a regulating device for an internal combustion engine which includes an intake pipe, an exhaust gas recirculation pipe configured to open into the intake pipe, a housing configured to have the intake pipe and the exhaust gas recirculation pipe be formed therein, a shaft configured to act as an axis of rotation, and a regulating element eccentrically mounted on the shaft. The shaft is arranged perpendicular to a center line of the intake pipe and to a center line of exhaust gas recirculation pipe. The regulating element comprises a first surface, a second surface, and guide ribs arranged on the first surface. In a first end position of the regulating element, in which the intake pipe is at least throttled upstream of an opening of the exhaust gas recirculation pipe, a normal vector of the first surface points to an upstream side of the intake pipe. In a second end position of the regulating element, in which the exhaust gas recirculation pipe is closed, a normal vector of the second surface points to the exhaust gas recirculation pipe.

BRIEF DESCRIPTION OF THE DRAWINGS

The present invention is described in greater detail below on the basis of embodiments and of the drawings in which.

DETAILED DESCRIPTION

Figure 1:
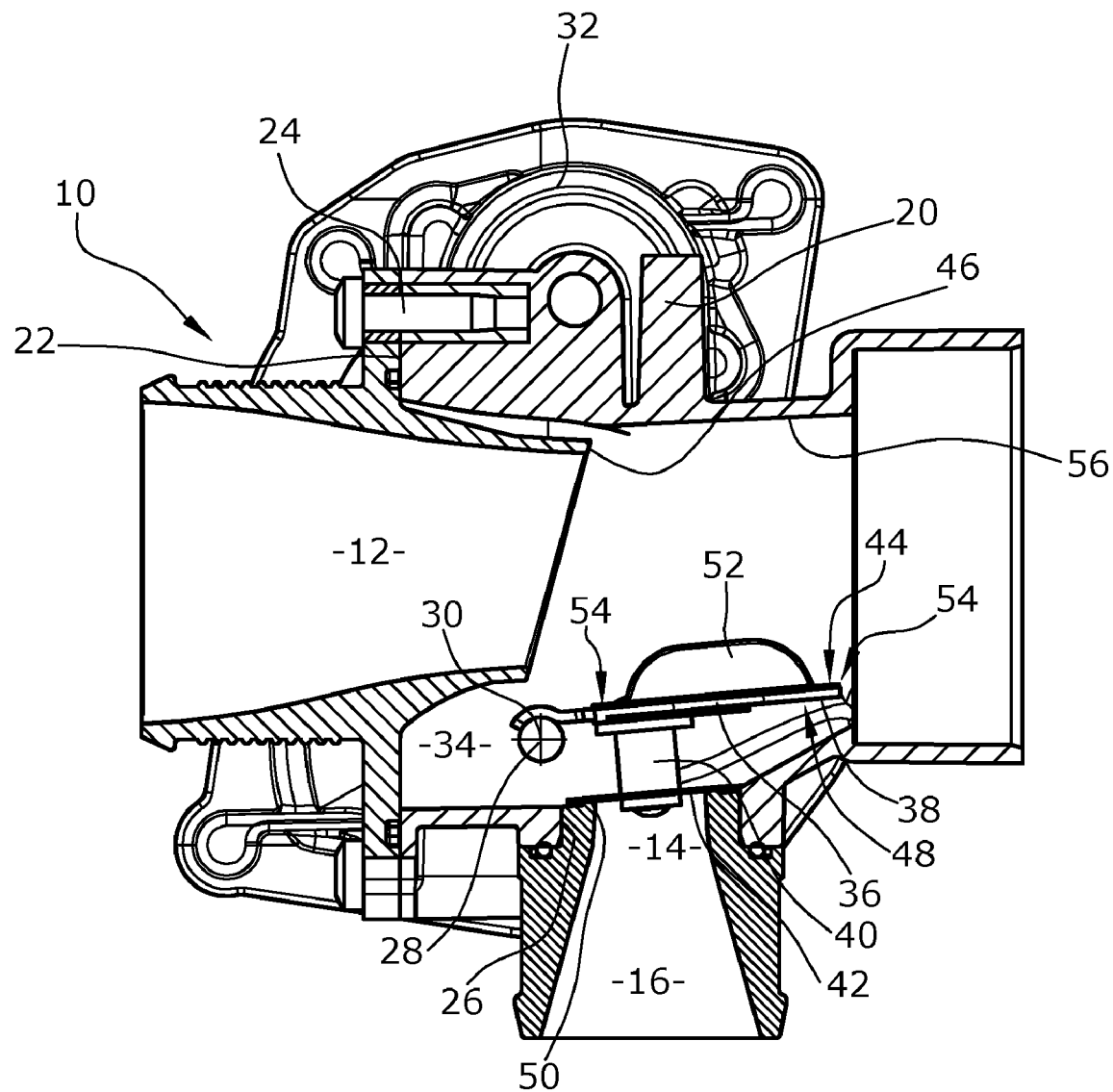
FIG. 1 shows a cross-sectional side view of a regulating device according to the present invention.

Due to the fact that guide ribs are formed on the first surface, the air flow taken in, which in particular at the critical operating conditions of the compressor under full load represents the considerably higher fraction of the mixed gas, is directed through the intake pipe. Depending on the configuration and arrangement of the guide ribs, the flow resistance can thereby be reduced by decreasing the turbulences, or the approach flow to the compressor can be optimized by directing it to the inlet in an optimum manner.

In an embodiment of the present invention, a first valve seat can, for example, be formed in the intake pipe against which a guide-rib-free area of the first surface of the regulating element axially rests in its first end position. An almost leakage-free closure of the intake pipe is attained due to such an axial resting of the surface against the valve seat. Despite the guide ribs, the intake pipe can be closed in an excellently sealed manner by utilizing an area where no guide ribs are formed for the surface to axially rest against the valve seat.

In an embodiment of the present invention, a second valve seat can, for example, be formed at the opening of the exhaust gas recirculation pipe against which the second surface of the regulating element rests in its second end position. The exhaust gas recirculation pipe can thus also be closed in an excellently sealed manner. The setup and assembly of the regulating element can be carried out in a particularly simple and inexpensive manner when both damper surfaces are used.

In an embodiment of the present invention, the regulating element can, for example, comprise a damper which is eccentrically fastened to the shaft and which has the first surface and the second surface, and a coupling member which extends from the second surface and at which a closing member is formed that cooperates with the second valve seat. Although the setup of such a regulating element is somewhat more complex, such a configuration can compensate for a staggered arrangement of the two valve seats while still providing a reliable closing. The area of the opening of the exhaust gas recirculation pipe can also be selected to be smaller so that the surface of the closing member can be selected to be smaller than that of the damper. The required installation space can thus be reduced.

The guide ribs can, for example, extend in parallel to each other along the first surface, whereby the air flow is straightened, which leads to smaller pressure losses and allows the air flow to be controlledly aligned, whereby the occurring turbulences are reduced when the exhaust gas flow enters the air flow.

In an embodiment of the present invention, the guide ribs can, for example, extend perpendicularly to the axis of rotation of the regulating element. The air flow is thus controlledly guided in a straight manner to the inlet of the compressor with only small pressure losses. Any occurring eddies or turbulences of the exhaust gas flow are also at least partially straightened by the air flow so that the mixed gas flow is introduced into a downstream compressor in an essentially parallel and straight manner, thereby increasing efficiency.

It is alternatively possible that the guide ribs extend so as to be positioned at a fixed angle to the axis of rotation of the regulating element. The air flow in such a configuration can be forced to assume an angle to the main flow direction of the air, whereby a spiral flow can be produced at the inlet of the compressor for improving performance. The guide ribs in such a configuration act as a guide vane assembly of the impeller, the approach flow to which can thereby in particular be optimized for certain operating conditions.

An even stronger spiral flow with a reduced pressure loss is attained when the guide ribs, with an increasing distance to the axis of rotation, have an increasing inclination towards a normal to the axis of rotation. An improved approach flow to the impeller of the compressor is also attained as a result, while at the same time the filling of the impeller is increased due to the decreased flow resistances compared with the embodiment described above.

In an embodiment of the present invention, the guide ribs can, for example, be formed at an increasing distance to each other in the direction of extension from the axis of rotation to the end distal to the axis of rotation. This means that the guide ribs are arranged like an open fan whose narrow end is located on the side of the shaft. The air flow is thereby directed to the areas near the wall so that the exhaust gas can in particular flow, with a lower flow resistance, from a smaller central exhaust gas pipe into the inside of the pipe. Condensation of water from the exhaust gas on the possibly cold pipe walls can be reduced due to this concentration of the exhaust gas flow in the central area of the pipe and thus in areas remote from the wall, thereby increasing the service life of the compressor.

In an embodiment of the present invention, the first surface can, for example, have a curved configuration. Such a curvature also serves to direct the air flow into a desired area but in a different plane. A convex configuration thus leads to a smaller flow resistance in the intake pipe with the intake pipe being only open, for example, to a small extent. The curvature is accordingly also used to direct the air flow into desired areas of the pipe with the pressure loss being as small as possible.

In an embodiment of the present invention, the guide ribs can, for example, be formed so that the air flow is adapted to be introduced into a defined area of the intake pipe. This shape may depend on the configuration of the compressor inlet and the downstream pipe routing. Depending on the type of internal combustion engine, either a thorough mixing, a laminar flow, a straight or swirl flows may be desired. A corresponding position of the guide ribs can be provided to improve the engine performance depending on the required type of flow.

In an embodiment of the present invention, the first valve seat can, for example, include an angle of 70° to 80° to the center line of the intake pipe. Such a smaller setting angle results in the air and exhaust gas flows across the overall setting area being also varied when the damper is rotated. The slope of the control curve in this setting area thus remains unchanged in large sections.

In an embodiment of the present invention, the first valve seat can, for example, have a smaller circumference than the section of the intake pipe downstream of the first valve seat, and the regulating element in its second end position, in which it closes the exhaust gas recirculation pipe, can, for example, be inserted into a recess in the intake pipe, which is arranged in the flow shadow of the upstream section of the intake pipe. In the case of an open intake pipe, this means that no flow resistance attributable to the damper exists so that the compressor is supplied with a larger air flow. The pipe is also essentially made longer by the damper resting against it so that a production of an eddy behind the valve seat due to an approach flow to the damper element proper, which approach flow would also lead to flow losses, is prevented.

A regulating device is thus provided via which both the air mass flow in the intake pipe and the exhaust gas mass flow of the exhaust gas recirculation circuit are adapted to be regulated, wherein, at the same time the performance of a downstream compressor for charging an internal combustion engine is optimized by an improved conduction of the flow. The conduction of the flow can be conformed by the guide ribs to the respective requirements of the internal combustion engine and/or to the existing required inflow conditions of the compressor used, wherein pressure losses due to occurring flow resistances or turbulences are avoided.

An exemplary embodiment of a regulating device according to the present invention is illustrated in the drawings and is described below.

The regulating device according to the present invention is composed of a housing 10 which delimits an intake pipe 12 and at which an opening 14 of an exhaust gas recirculation pipe 16 is formed. The intake pipe 12 essentially extends in a straight direction to an axial inlet (not shown in the drawings) of a compressor housing of a turbocharger, while the exhaust gas recirculation pipe 16 opens approximately perpendicularly to the intake pipe 12 into the latter.

The housing 10 is composed of a first essentially tubular intake housing 18 whose downstream end is of an inclined configuration and which includes an angle α of approximately 80° to a center line of the intake pipe 12. The downstream end of the intake housing 18 projects into a mixing housing 20 and/or is inserted into the mixing housing 20 until a flange 22 rests against the mixing housing 20 via which the intake housing 18 is fastened to the mixing housing 20 by screws 24.

The opening 14 of the exhaust gas recirculation pipe 16 laterally projects into a port 26 of the mixing housing 20 which is configured as a separate housing portion. The mixing housing 20 forms an extension of the intake pipe 12 which then, in turn, ends in the axial inlet of the compressor housing. In the mixing housing 20, a shaft 28 is mounted so that it can be rotated about an axis of rotation 30 and can be actuated via an actuator 32. The axis of rotation 30 of the shaft 28 is arranged perpendicularly to the center lines of the intake pipe 12 and the exhaust gas recirculation pipe 16 and is located between the opening 14 of the exhaust gas recirculation pipe 16 at the end of the exhaust gas recirculation pipe 16 downstream of the air flow and the axial end of the intake housing 18 on the side facing the exhaust gas recirculation pipe 16. The throughflow cross-section of the intake housing 18 is smaller than that of the mixing housing 20, wherein the intake housing 18 is fastened to the mixing housing 20 and projects into the mixing housing 20 so that a recess 34 formed downstream of the opening 14 of the exhaust gas recirculation pipe 16 is arranged in the flow shadow of the air flow from the intake housing 18, in which recess 34 the shaft 28 passes through the mixing housing 20.

A regulating element 36 is fastened to the shaft 28 which is eccentrically arranged in the intake pipe 12, the regulating element 36 being composed of a damper 38 as well as a closing member 42 fastened to the first damper 38 via a coupling member 40. The damper 38 extends from the shaft 28 into the inside of the mixing housing 20 and governs the throughflow cross-section of the intake pipe 12. For this purpose, the first surface 44 of the damper 38 cooperates with the axial end of the intake housing 18 acting as a first valve seat 46 against which the first surface 44 of the damper 38 rests in a first end position in a state for closing the intake pipe 12 so that in this state a normal vector of the first surface 44 points to the upstream side of the intake pipe 12 and/or to the intake housing 18.

A bore is formed in the damper 38 in which the coupling member 40 is fastened to the damper 38. The coupling member 40 perpendicularly extends from a second surface 48 opposite to the first surface 44 and its opposite end passes through the closing member 42 which, in turn, is fastened to the end of the coupling member 40. Due to this fastening of the closing member 42, the exhaust gas recirculation pipe 16 is closed when the shaft 28 is rotated into a second end position in which the closing member 42 rests against a second valve seat 50 formed at the end of the opening 14 of the exhaust gas recirculation pipe 16. In this second end position, a normal vector of the second surface 48 accordingly points to the exhaust gas recirculation pipe 16.

According to the present invention, a plurality of guide ribs 52 are formed on the first surface 44 of the damper 38, the guide ribs 52 extending into the intake housing 18 when the damper 38 rests against the first valve seat 46. The damper 38 comprises an area 54 where no guide ribs 52 are formed. This guide-rib-free area 54 of the surface 44 of the damper 38 rests against the first valve seat 46 when the intake pipe is closed. Care must be taken in such a configuration that the guide ribs 52 are arranged so that the rotational movement of the shaft 28 out of the end position in which the intake pipe 12 is closed is not affected by the guide ribs 52 abutting against the pipe walls of the intake housing 18. As soon as the surface 44 is lifted from the valve seat 46, air flows from the intake housing 18 into the mixing housing 20 along the guide ribs 52 which extend with their overall length on the first surface 44 perpendicularly to the axis of rotation 30 and in parallel to each other in the embodiment illustrated in FIGS. 1 to 3.

The guide ribs 52 are either connected to the damper 38 via a substance-to-substance connection or are formed integral therewith. The damper 38 may also have a base element made of metal which is spray-coated, wherein the guide ribs 52 are formed on the plastic layer.

Figure 2:
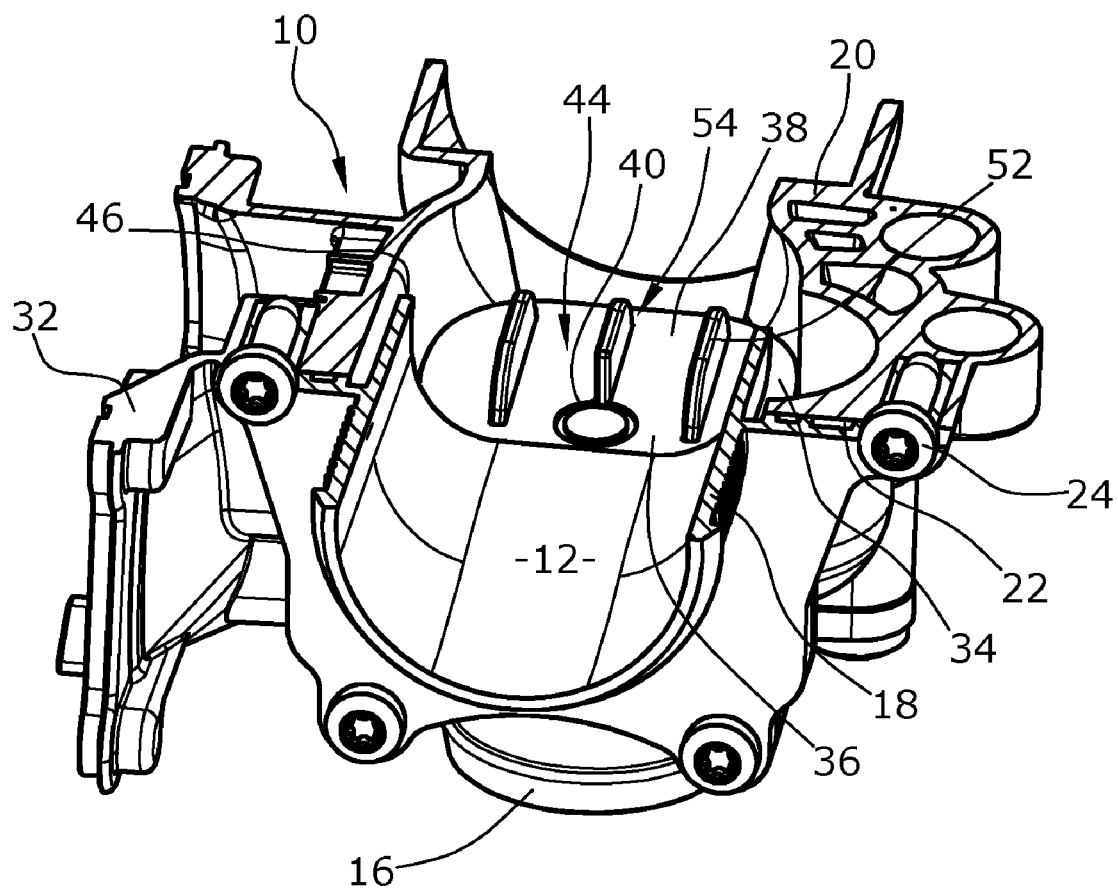
FIG. 2 shows a cross-sectional perspective view of the regulating device according to the present invention shown in FIG. 1.
Figure 3:
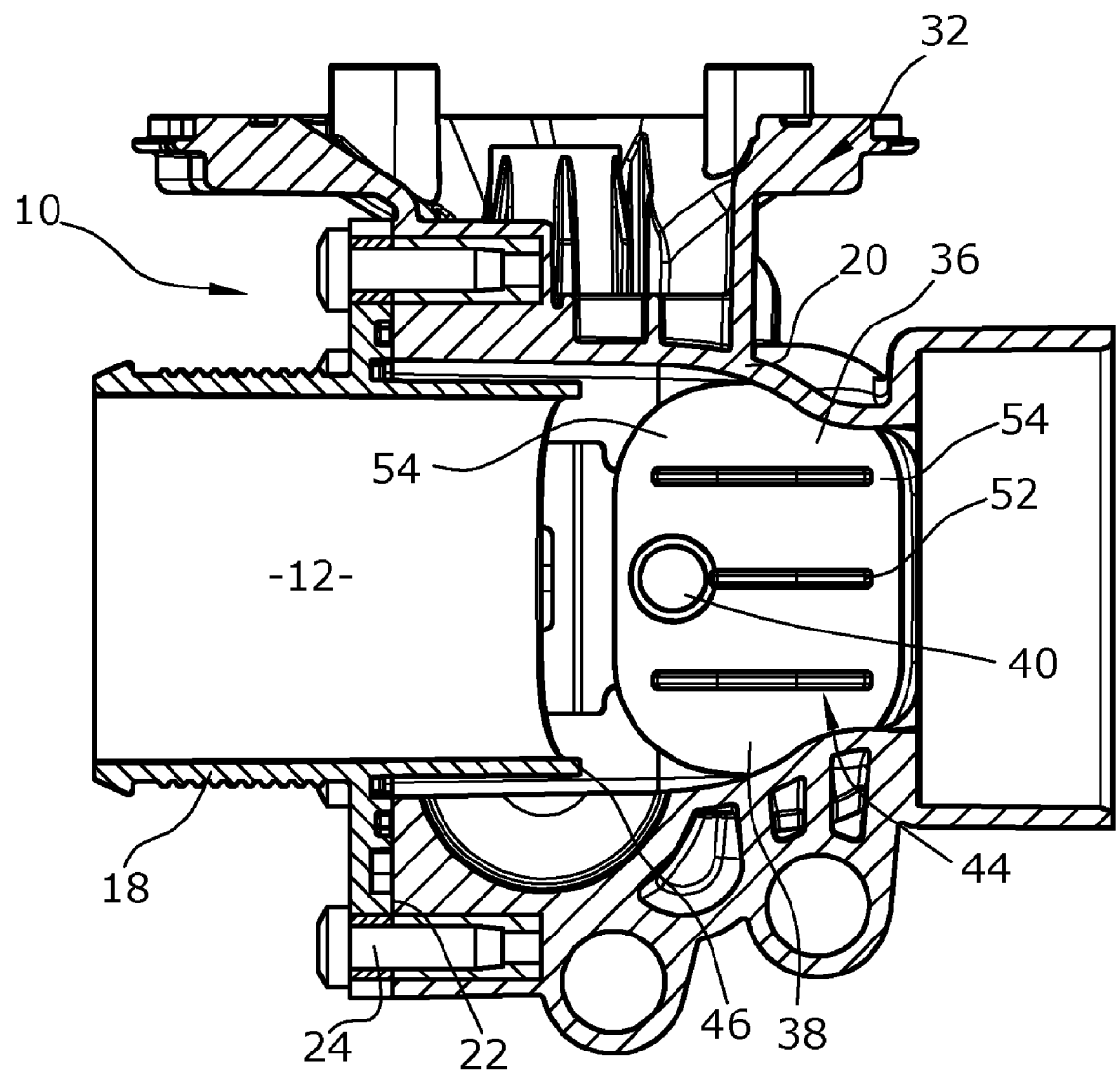
FIG. 3 shows a cross-sectional top view of the regulating device according to the present invention.

In the embodiment of the guide ribs 52 illustrated in FIGS. 1 to 3, the air flow is straightened as soon as the damper 38 has been lifted from the valve seat 46. This always takes place in the area near the damper, that is, with the exception of the fully closed exhaust gas recirculation pipe 16, in the area which is located immediately adjacent to the area through which the exhaust gas from the exhaust gas recirculation pipe 18 flows. This means that the exhaust gas flow is always introduced into a straightened air flow, which results in a uniform slow mixing. Larger turbulences and a resultant higher pressure loss are thus avoided. This small flow resistance additionally leads to a large fraction of mixed gas being supplied to the compressor via the compressor inlet, whereby the performance of the downstream internal combustion engine is increased.

FIGS. 4 to 7 show various further advantageous embodiments of these guide ribs 52 on the first surface 44 whose shape and arrangement may vary depending on the configuration and size of the downstream compressor and the internal combustion engine as well as the field of use.

Figure 4:
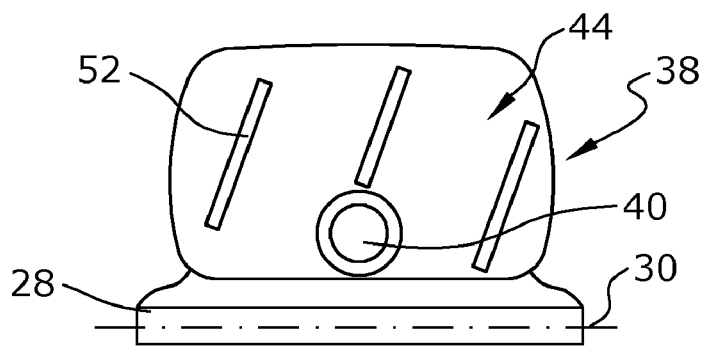
FIG. 4 schematically shows an embodiment of a possible arrangement of the guide ribs of a regulating device according to the present invention.

FIG. 4 thus shows guide ribs 52 on the first surface 44 of the damper 38 which are positioned at an angle of approximately 20° relative to a normal to the axis of rotation 30 of the shaft 28. As a result, an air flow is deflected to the side by these guide ribs 52 and a swirl is forced upon the air flow. This swirl results in the mixed gas flow also being subjected to swirl and the exhaust gas being more rapidly mixed with the air. The performance of the latter may be improved due to the swirling inflow into an inlet of the compressor.

Figure 5:
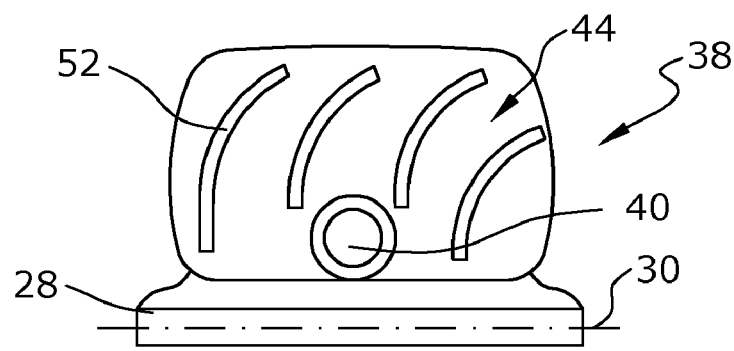
FIG. 5 schematically shows an embodiment of a possible arrangement of the guide ribs of a regulating device according to the present invention.

The embodiment illustrated in FIG. 5 also results in an increased performance of the downstream compressor due to an impressed swirl, however, with a reduced flow resistance and thus an increased overall mixed gas flow. In this embodiment, the guide ribs 52 again extending in parallel have an arcuate configuration, wherein the inclination towards the normal to the axis of rotation 30 of the shaft 28 also increases with an increasing distance to the shaft 28. Due to this gradual deflection of the air flow as compared with the embodiment illustrated in FIG. 4, fewer turbulences occur and, as a consequence, the flow resistance is decreased. The air is also strongly directed into areas near the wall, whereby the exhaust gas flow rather accumulates in central areas of the intake pipe. Condensation of the water from the exhaust gas on cold outer walls can thus be avoided at low temperatures.

Figure 6:
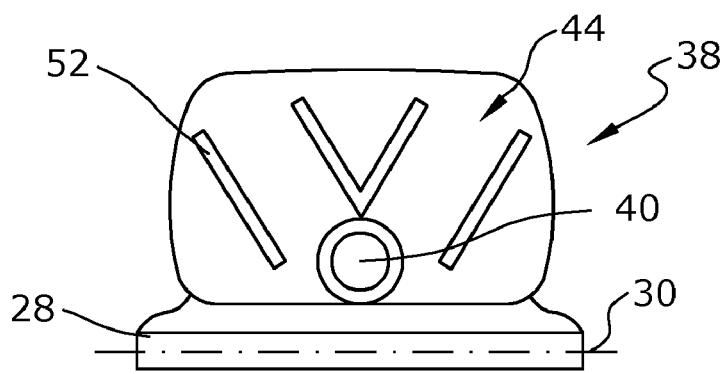
FIG. 6 schematically shows an embodiment of a possible arrangement of the guide ribs of a regulating device according to the present invention.

FIG. 6 shows another possible embodiment of the guide ribs 52 on the surface 44. The guide ribs 52 are arranged in a V-shape relative to each other so that the distance to one another accordingly also increases with an increasing distance to the axis of rotation 30. In the illustrated embodiment, the air flow in the area near the damper, and thus in the area of inflow of the exhaust gas into the air flow, is also deflected from the central pipe area into the area near the wall but without a swirl being produced. This central introduction of the exhaust gas flow again offers the advantage that the hot exhaust gas flow carrying water vapor is introduced into an area where it is not immediately directed to walls 56 of the intake pipe 12 which may be cold depending on ambient conditions. Any condensation of the water is accordingly considerably reduced, whereby, in turn, damage to the blades of the compressor is avoided. The flow resistance here remains relatively low.

Figure 7:
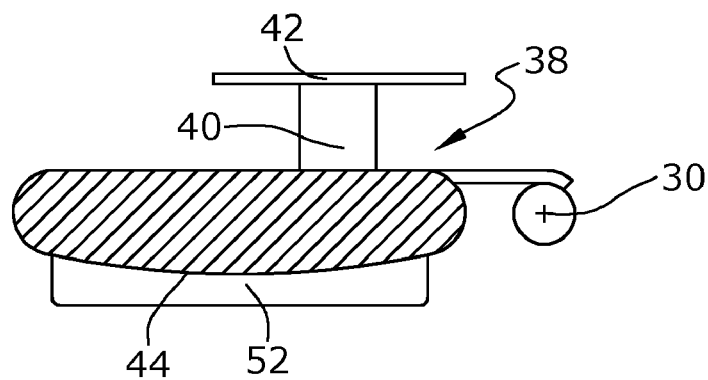
FIG. 7 schematically shows an embodiment of a possible arrangement of the guide ribs of a regulating device according to the present invention.

In the embodiment illustrated in FIG. 7, the guide ribs 52 are again formed perpendicularly to the axis of rotation 30, but they are located on a surface 44 which is convex as seen in a cross-sectional view, which leads to the air flow having a small angle to the surrounding walls 56 when the damper 38 is slightly opened. This also results in a reduced flow resistance.

The described regulating device is thus suitable for a very exact proportioning of an air mass flow and an exhaust gas flow using only one actuator, wherein the flows can be directed in almost any desired manner by using guide ribs on the first surface of the damper facing the air flow in order to optimize the performance of the internal combustion engine and/or the performance of a downstream compressor without having to use any further fittings. For this purpose, via a corresponding arrangement of the ribs, the air flow can be straightened, a swirl may be applied to the air flow, or it may be directed into areas near the wall. It can also either be introduced into the exhaust gas flow or kept away therefrom. Besides the degrees of mixture adapted to be influenced in this manner, flow resistances or condensation of the exhaust gas can also be influenced.

It should be appreciated that the scope of protection of the present application is not limited to the described exemplary embodiments. Various versions of the position of the guide ribs as well as various shapes of the surfaces of the damper are also conceivable. As described above, it is also possible to configure the regulating device with or without an additional closing member. Reference should also be had to the appended claims.

What is claimed is:

1. A regulating device for an internal combustion engine, the regulating device comprising:
   an intake pipe;
   a first valve seat arranged in the intake pipe;
   an exhaust gas recirculation pipe configured to open into the intake pipe;
   a housing configured to have the intake pipe and the exhaust gas recirculation pipe be formed therein;
   a shaft configured to act as an axis of rotation, the shaft being arranged perpendicular to a center line of the intake pipe and to a center line of exhaust gas recirculation pipe; and
   a regulating element eccentrically mounted on the shaft, the regulating element comprising a first surface, a second surface, and guide ribs arranged on the first surface,
   wherein,
   in a first end position of the regulating element, in which the intake pipe is at least throttled upstream of an opening of the exhaust gas recirculation pipe, a normal vector of the first surface points to an upstream side of the intake pipe,
   in a second end position of the regulating element, in which the exhaust gas recirculation pipe is closed, a normal vector of the second surface points to the exhaust gas recirculation pipe, and
   a guide-rib-free area of the first surface of the regulating element is configured to rest against the first valve seat in the first end position.

2. The regulating device as recited in claim 1, wherein the first valve seat includes an angle of 70° to 80° to the center line of the intake pipe.

3. The regulating device as recited in claim 1, wherein,
   the first valve seat comprises a circumference which is smaller than a circumference of a section of the intake pipe downstream of the first valve seat,
   the intake pipe comprises a recess arranged in a flow shadow of an upstream section of the intake pipe, and
   the regulating element, in the second end position in which it closes the exhaust gas recirculation pipe, is inserted into the recess in the intake pipe.

4. The regulating device as recited in claim 1, further comprising:
   a second valve seat arranged at the opening of the exhaust gas recirculation pipe,
   wherein,
   the second surface of the regulating element is configured to rest against the second valve seat when in the second end position.

5. The regulating device as recited in claim 4, wherein, the regulating element further comprises,
   a damper eccentrically fastened to the shaft, the damper comprising the first surface and the second surface, and a coupling element configured to extend from the second surface, the coupling element comprising a closing member formed thereon which is configured to cooperate with the second valve seat.

6. The regulating device as recited in claim 1, wherein the guide ribs are configured to extend in parallel to each other along the first surface.

7. The regulating device as recited in claim 6, wherein the guide ribs are configured to extend perpendicular to the axis of rotation.

8. The regulating device as recited in claim 1, wherein the guide ribs extend so that they are positioned at a fixed angle to the axis of rotation.

9. The regulating device as recited in claim 1, wherein the guide ribs, with an increasing distance to the axis of rotation, are arranged to have an increasing inclination towards a normal to the axis of rotation.

10. The regulating device as recited in claim 1, wherein the guide ribs, with an increasing distance to each other, are formed in a direction of extension from the axis of rotation to an end distal to the axis of rotation.

11. The regulating device as recited in claim 1, wherein the first surface comprises a curved configuration.

12. The regulating device as recited in claim 1, wherein the guide ribs are formed so that an air flow is adapted to be introduced into a defined area of the intake pipe.

\* \* \* \* \*